United States Patent Office 2,807,833
Patented Oct. 1, 1957

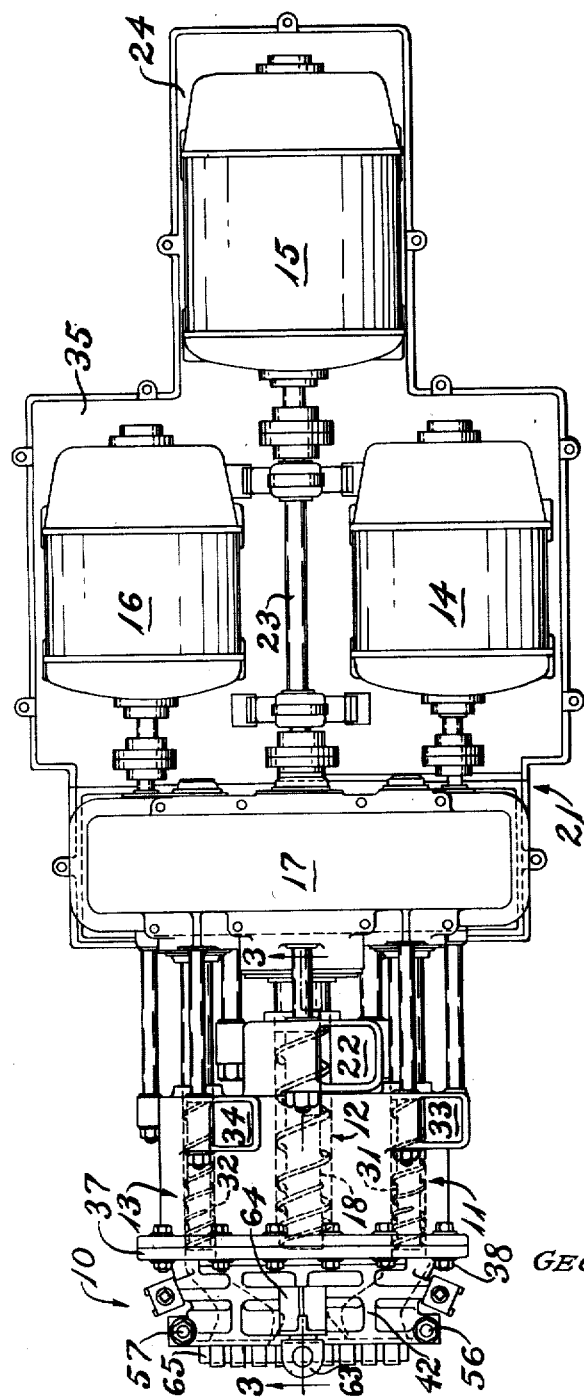

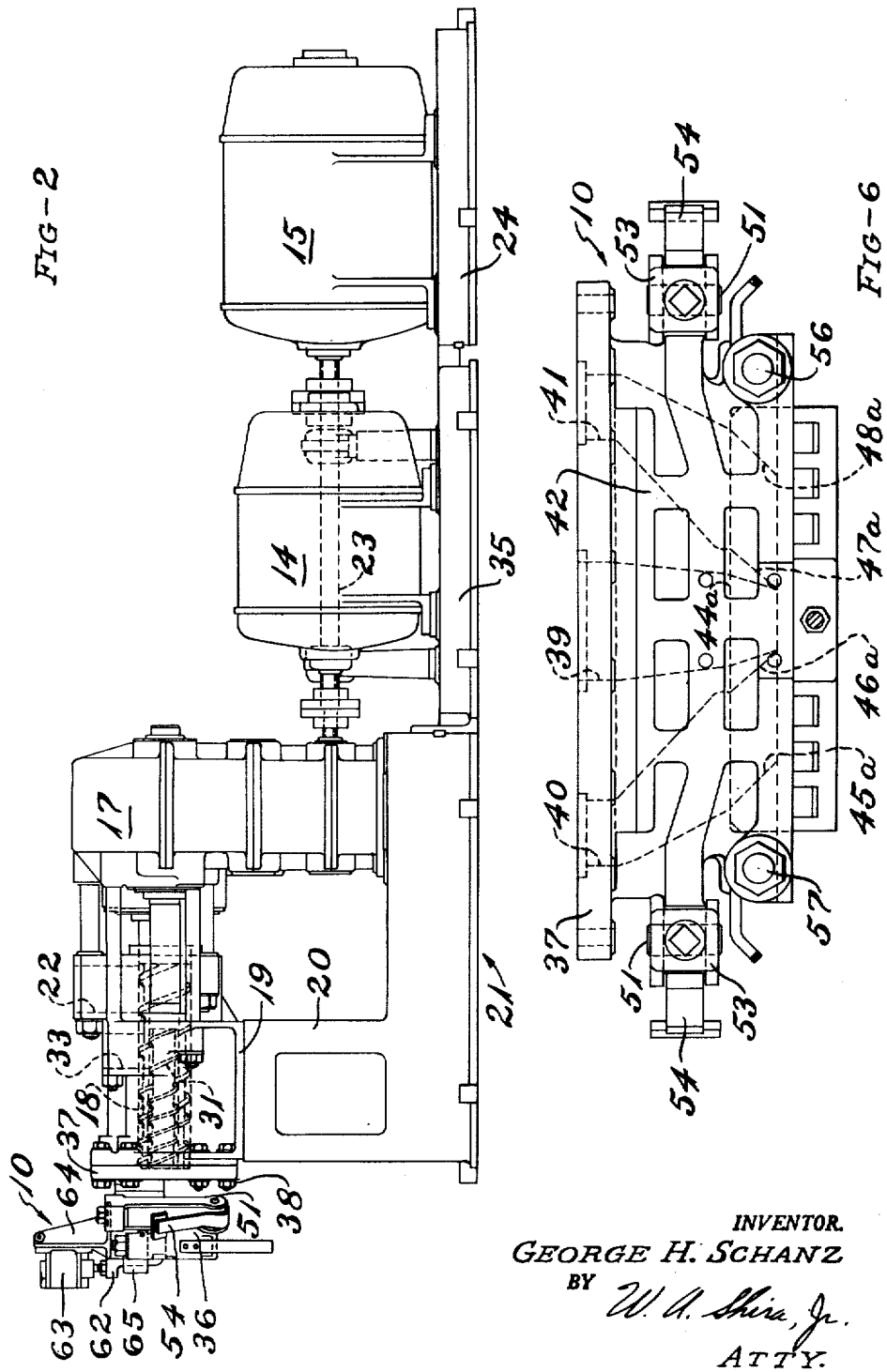

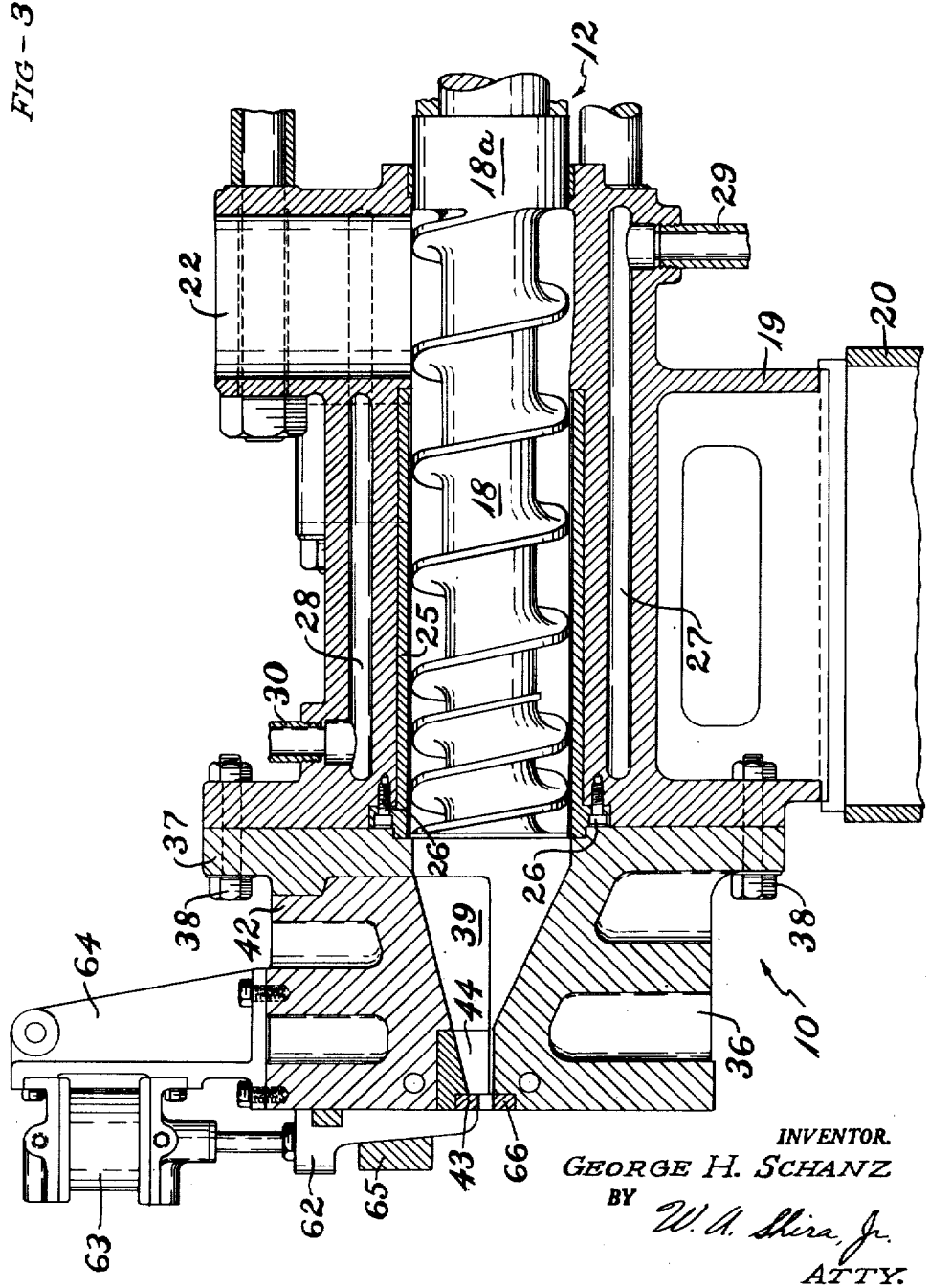

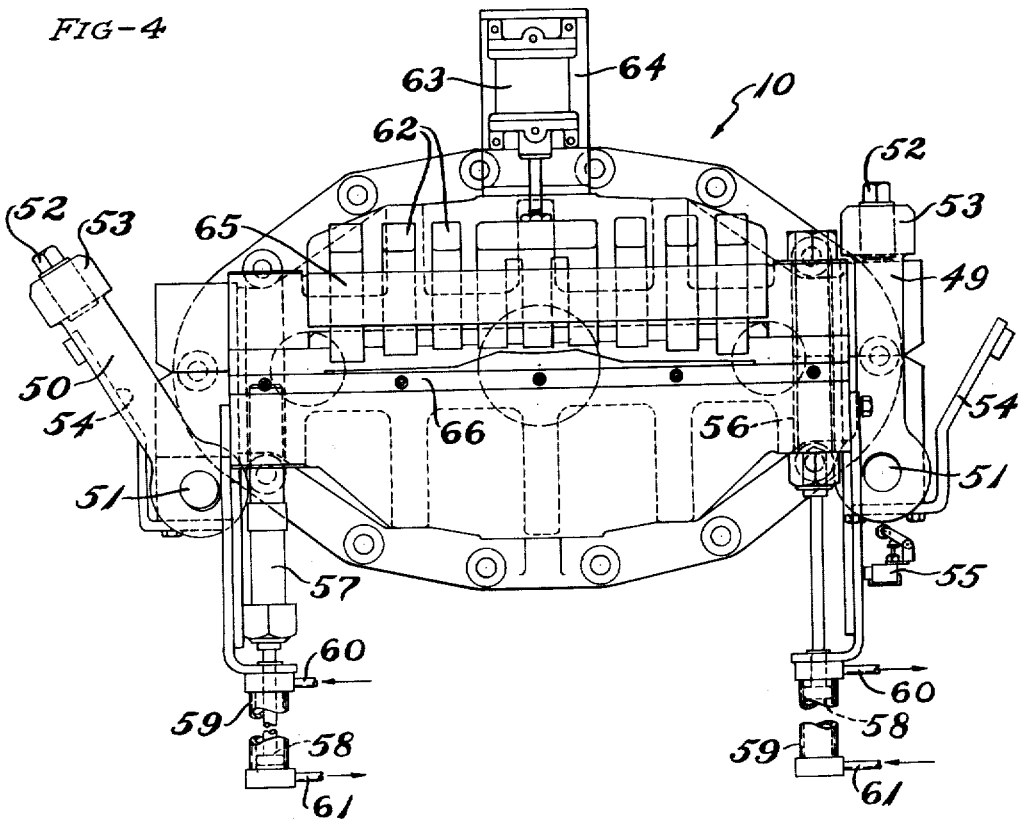
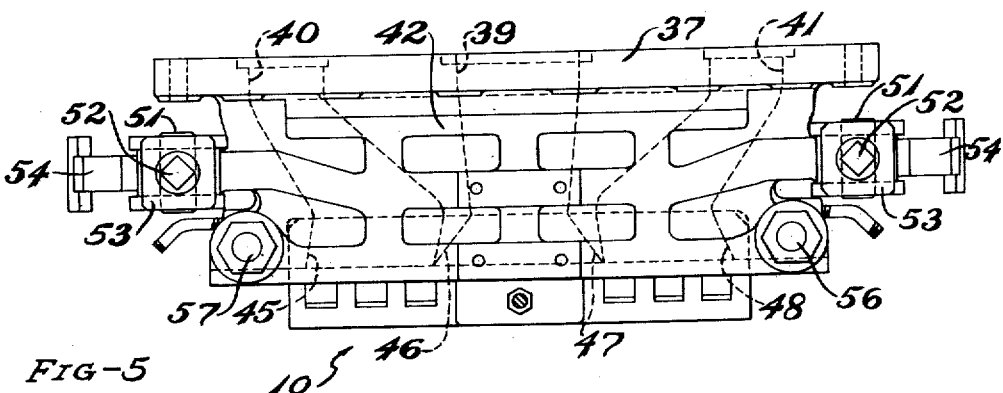

2,807,833

APPARATUS FOR MULTIPLE EXTRUSION

George H. Schanz, Akron, Ohio, assignor to The B. F. Goodrich Company, New York, N. Y., a corporation of New York Application April 18, 1955, Serial No. 502,169

11 Claims. (Cl. 18—13)

This invention relates to an apparatus for extruding plastic materials and, more particularly, it relates to an apparatus for simultaneously extruding a plurality of materials of different characteristics and effecting a union of the materials during the extrusion.

In the manufacture of articles from plastic materials it is frequently desirable to form the articles, or components thereof, by extrusion and to have the extrusions composed of a plurality of materials having different physical properties such as different colors, different wear-resisting abilities, and the like. For example, the tread for a pneumatic tire requires good abrasion resistance but this characteristic is of lesser importance in the sidewall covering where flex resistance is more essential. Also, one or both the sidewalls of the tire may be white while the tread is black. Consequently, the elastomeric compositions employed for these several parts must be different yet they must be united without fault in adhesion or irregular appearance at the places of union. Moreover, manufacturing procedures make it desirable for the tread and sidewall materials to be employed in unitary form during the tire building operation, and hence it is desirable that these portions be formed simultaneously and as a unit. Similar problems arise in the manufacture of other articles from materials while in plastic condition and efforts have, therefore, been made to effect the desired shaping and union of the several materials by simultaneous extrusion through a common die. However, the apparatuses that have heretofore been devised for effecting such multiple extrusion operations have not proved entirely satisfactory since they have not been readily adaptable to handle extrusions of different sizes within a given range, have been difficult to clean, required excessive power, did not provide extrusions of uniform appearance or dimensions, or were subject to other objections.

An object of this invention is, therefore, to provide an improved apparatus for extruding, in the form of a unitary continuous strip, a composite of several plastic materials; the apparatus being characterized by having preforming and finishing dies readily removably supported in a die head and supported in communication with a plurality of material advancing and pressuring mechanisms whereby the plurality of materials to be simultaneously extruded are united into a unitary strip with the locations of joining of the materials and the dimensions of the composite strip being readily selected by changing the preforming and/or finishing dies.

Another object of the invention is to provide an improved extrusion apparatus as defined in the preceding paragraph wherein the several material advancing and pressuring mechanisms each comprise a hollow cylinder with a power driven screw therein, the several cylinders being disposed with their axes parallel and aligned with the material passages in the die head so that power consumption and internal stresses are kept at a minimum and cleaning is facilitated.

A more specific object of the invention is the provision of an improved tuber for extruding tire tread and tire sidewall covers as a unitary strip of composite materials, the apparatus having a plurality of extrusion screws disposed in parallel relationship and acting to supply the separate materials therefrom into a common chamber of a die head which is divided into adjacent passages by a removable portion having partition walls therein at least the outer ends of which are provided in a removable preforming die, whereby the locations of the unions of the several materials may be changed by replacing the preforming die and all the passages in the head may be rendered readily accessible for cleaning by removing the said portion provided with the partition walls.

The invention further resides in certain novel features of the construction and in the combination and arrangement of parts of the apparatus in which the invention is embodied, and further objects and advantages thereof will be apparent from the following description of the presently preferred embodiment of the inventon taken in conjunction with the accompanying drawings, forming a part of this application, and in which:

Fig. 1 is a top view of the improved triple screw tuber or extruder;

Fig. 2 is a side elevational view of the apparatus shown in Fig. 1;

Fig. 3 is an enlarged, fragmentary, longitudinal sectional view taken substantially on the irregular section indicating line 3—3 of Fig. 1;

Fig. 4 is an enlarged front elevation of the die head of the apparatus as seen from the left-hand side of Fig. 1 with one of the locating pins retracted and one of the retaining members for the die head shown in its released position;

Fig. 5 is a top view of the die head detached from the remainder of the apparatus and with the supporting bracket and operating cylinder for the finishing die retaining means removed, the die head being shown as provided with a preforming die adapted to provide a composite tire tread and sidewall strip with a relatively wide tread portion; and Fig. 6 is similar to Fig. 5 but shows the die head as having a different preforming die therein.

A complete, self-contained apparatus incorporating the invention is illustrated in Figs. 1 and 2 as comprising a die head 10 to which material is supplied by a plurality of parallel feeding and pressuring means 11, 12 and 13, operated by separate prime movers, 14, 15 and 16 through a speed reduction mechanism 17. As here shown, the apparatus is intended for simultaneously extruding material from three separate sources and to unite these materials into one composite member or strip. Specifically, the apparatus is designed to extrude a strip of rubber of a size and shape to comprise both the tread portion and the sidewall covers for a pneumatic tire. Therefore, the central feeding and pressuring means 12 is of larger size and capacity than the two side feeding and pressuring means 11 and 13, since the volume of rubber stock in the tread portion of the extruded strip should be greater than that of the sidewall portions which are supplied by the feeding and pressuring means 11 and 13. The feeding and pressuring means 11, 12 and 13 are otherwise identical and hence only one will be described in detail.

The central feeding and pressuring means 12, as shown in section in Fig. 3, comprises a material feeding and pressuring screw 18 operating in a cylindrical opening in a cylinder block 19 that is supported on an up-standing portion 20 of a base 21. Material is supplied to the screw 18 through a feed hopper 22 opening to the top of the block 19 and having a passageway extending into the cylindrical opening for the screw 18 adjacent the rear and at one side thereof as will be apparent from Figs. 1 and 3. The rear portion of the screw 18 has a cylindrical portion 18a that provides a seal for the rear end of the cylinder in which the screw operates, and rearwardly of the portion 18a is an integral extension which is connected with the output shaft 23 of the prime mover 15 by gears, not shown, in speed reduction unit 17. The prime mover 15 is here illustrated as an electric motor mounted upon a suitable pad or base 24, which may be a portion of the main base 21.

The cylindrical opening in which the feed screw 18 operates is preferably provided throughout the major portion of its length with a removable liner 25 which is held in place by suitable screws or the like 26. The material that is worked and pressured forwardly by the screw 18 is maintained at proper temperature by circulation of a temperature conditioning fluid through suitable passages, such as 27 and 28, provided in the block 19 to which the fluid is supplied and from which the fluid is removed by conduits or pipes 29 and 30 that lead to any suitable source of supply of the fluid.

The material feeding and pressuring means 11 and 13 are similar in construction to that which has been described with reference to Fig. 3, and hence comprise, respectively, feed screws 31 and 32 operating in cylindrical openings in the block 19 which are surrounded by suitable passages for circulation of conditioning fluid similar to the passages 27 and 28 shown in Fig. 3. The material, which is fed and worked by the screw 31, is supplied thereto through a hopper 33 while a similar hopper 34 is provided for supplying the material to the feed screw 32. These hoppers are similar to the hopper 22 and communicate with the associated feed screws in like manner. The feed screws 31 and 32 are connected to separate trains of gears in the speed reducing unit 17 and from the latter are connected, respectively, to the output shafts for the motors 14 and 16 which are mounted upon the portion 35 of the base 21. The axes of the feeding and pressuring means 11, 12 and 13 are parallel and the discharge ends of the respective cylinders of the feeding means are unobstructed and communicate with aligned passages in the common die head 10 which is bolted to the cylinder block 19.

The illustrated die head comprises a main body member 36 which has a rear, vertically extending, plate-like portion 37 removably secured to the vertical end face of the block 19 by bolts and nuts 38. This portion of the body member has the passages or openings for the material coming from the feed screws of cylindrical shape and of the same diameters as the aligned feed cylinders. From these cylindrical portions of the passages in the die head, the material supplied thereto moves forwardly and in converging relationship toward the other side face of the die head through passages 39, 40 and 41 provided, in part, by partitions in the main body portion 36 of the die head and, in part, by cooperating walls or partitions in an auxiliary body member 42, which is releasably connected to the main body member in a manner hereinafter described in detail. The construction is such that, when the auxiliary body member 42 is removed, the passages 39, 40 and 41 are exposed throughout the principal parts of their length, and the walls or partitions defining the majority of the length of these passages are removed since they are provided by projections on the under surface of the member 42. In other words, the main body member 36 can be said to have a common chamber which is divided into merging passages by partitions or walls provided upon the auxiliary body member 42 and which cooperate with the fragmentary portions of such partition or walls formed in the lower surface of the common chamber in the body member 36 to provide the separate passageways.

As will be apparent from Figs. 5 and 6, the passageways 39, 40 and 41 in the die head 10 have inclined walls, which direct the material into approximately the desired final shape, the adjacent walls or surfaces merging or terminating short of the outer end face of the die head 10 so that the materials, fed forwardly through the passages 39, 40 and 41, unite and are formed into a unitary strip before leaving the die head. The united composite strip of material, thus partially preformed or preshaped, then passes through an opening in a finishing die 43, that is removably secured to the die head 10, and this finishing die provides the desired final configuration for the composite strip.

It is frequently desirable to change the lateral extents of the several longitudinal portions of the composite strip which is formed by the materials moving forwardly through the passages 39, 40 and 41 as, for example, when it is desired to form strips for use in tires having white sidewalls that differ with respect to the locations of union of the white sidewall material with the central tread stock. Also, in order to provide composite strips for tires of different sizes, it is necessary that the total width of the strip, as well as the locations of union of the several portions of material comprising that strip, be altered. In accordance with this invention, these variations in the forming of composite strips can be readily effected without major changes of the apparatus; in fact, by simple replacement of interchangeable insert members.

The change in nature of strip extruded could be effected by substituting a different auxiliary body member 42 having the desired wall configurations. Preferably, however, the under surface of the auxiliary body member 42 is provided, adjacent its outer face, with a recess in which is fitted a removable insert or preforming die member 44. The base portion of the removable preforming die 44 is complementary in shape to the shape of the recess in which it is received and extending from this base portion are spaced projections 45, 46, 47 and 48 defining the walls or partitions defining the passages in this part of the die head. By providing inserts or preforming dies 44 having the wall portions inclined different extents, the locations of union of the several parts of the composite material, as well as the width of the total composite strip, can be readily changed by simply substituting for one insert or die member 44 another insert having the walls differently shaped. Thus, with reference to Fig. 5, it will be seen that the wall portions 45, 46, 47 and 48, provided by the insert 44, allow the outer sides of the two end portions of the material to move laterally outward adjacent the outer end face of the die head and the central portion of material coming through the passage 39 to likewise spread or move laterally outwardly. Replacing the insert or preforming die 44 with the insert or preforming die 44a, as shown in Fig. 6, provides wall members 45a, 46a, 47a and 48a of different configurations which result in the production of a narrower composite strip with a much narrower central portion. It will thus be seen that the apparatus is readily adapted for use in forming tread and sidewall strips of a range of different sizes and with different locations of union of the several materials comprising the composite strip.

The auxiliary body member 42 of the die head is clamped to the main body portion 36 of the die head by a pair of readily releasable clamping means disposed at either side of the die head adjacent its outer end face. These clamping members are identical and each comprises a pair of spaced bars 49 and 50, the lower ends of which are enlarged and provided with aligned circular openings. These openings each receive a horizontally extending rod or pin 51 provided in the lower or main body member 36 of the die head, the pins being of smaller diameter than the openings in the bar members. The spaced bar members 49 and 50 of each pair are joined together at their upper ends by a transversely extending connecting portion which is tapped and receives a set screw 52. The lower end of each screw 52 is adapted to engage the upper surface of a horizontal portion of the auxiliary member 42 of the die head and exert vertical pressure thereon forcing it into engagement with the main body 36 of the die head when the screw is tightened, the screw being held in its tightened position by means of a lock nut 53.

The construction in such that, when both clamping means are in the position shown for the clamping means at the right-hand side of Fig. 4, the bars 49 and 50 of the clamping means straddle horizontally extending ears or lug portions of the main and auxiliary body members of the die head so that they are not only held firmly clamped together against vertical separation but, in addition, the auxiliary member is prevented from moving horizontally relative to the main body member. When it is desired to release the auxiliary portion of the die head, the screws 52 are backed off sufficiently to allow the two pairs of bars to be swung from the position shown at the right of Fig. 4 to a position such as is shown for the left-hand clamping means in that figure, this being facilitated by the difference in diameters of the openings in the bar members and of the pins 51 which passes therethrough. The clamping means are held in readily accessible position after release by suitable angular rests 54, there being one for each of the clamping means. In order that there can be no inadvertent operation of the apparatus when the die head is released, a suitable safety switch 55 is provided adjacent at least one of the clamping means and, preferably, such a switch is provided for each of the clamping means. This switch or switches control the operation of the motors 14, 15 and 16 as will be readily understood by those skilled in the art.

Proper alignment of the insert of preforming die 44 in the auxiliary body 42 of the die head is secured by the aforementioned complementary interfitting surfaces provided by the recess in the auxiliary body member 42 and by the base of the insert 44. The finishing die 43 is likewise easily aligned and positioned relative to the passages in the die head by having it received in a recess in the insert or preforming die 44, see Fig. 3. Alignment of the auxiliary body member 42 of the die head with the main body member 36, and hence proper alignment of the several portions of the dividing or partition walls, is achieved by a pair of reciprocating pins 56 and 57 which are positioned, respectively, adjacent the die clamping means and are moved to and from engagement in aligned openings in the main and auxiliary body members by power means. As here shown, the power means are fluid pressure operated and each comprise a piston, such as 58, operating in a cylinder 59 to which fluid under pressure is supplied and from which the fluid is exhausted through suitable conduits such as 60 and 61. Preferably, the pins 56 and 57 are simultaneously placed in position or moved therefrom, but for the purpose of illustrating the two positions of the pins, Fig. 4 shows one such pin removed and the other in its operative position. Thus, the pin 56 is shown fully positioned in its openings in the die head while pin 57 is withdrawn sufficiently to permit separation of the several parts of the head.

The insert or preforming die 44 and the finishing die 43 are held against outward movement relative to the die head by suitable retractable retaining means of conventional construction. As here shown, this means comprises a plurality of tapered, spaced, finger-like members 62 vertically slidable on the end or forward face of the die head 10 and connected together for simultaneous movement. The members 62 are vertically movable by a piston operating in a cylinder 63 that is secured to the upper surface of the auxiliary body member 42 by means of a suitable bracket or the like 64. The finger-like members 62 in their lowermost position engage the outer surface of the finishing die 43 and of the preforming die 44 securely holding these in place since the outer surfaces of these finger-like members are tapered and engage a correspondingly sloped surface on a bar 65 extending transversely of the die head in spaced relationship to the end face thereof. The ends of the bar 65 are secured to the auxiliary body member 42 adjacent its ends as will be readily understood by those skilled in the art.

The finishing die 43 may be made in the form of a single plate having a slot therein of size and shape corresponding to that of the composite strip to be formed by the apparatus. However, since in the form of the apparatus here shown the composite strip of material which is to be extruded has its lower surface planar, the finishing die is preferably provided with an open bottom opening the edges of which define the upper and end surfaces of the composite strip extruded therethrough. The lower surface of the extruded strip is defined by the upper edge of a wear plate 66 which may be removably secured to the main body portion 36 of the die head by screws or the like and need not be replaced each time the nature of the extruded composite strip is changed, but only when the upper surface of the plate becomes sufficiently worn to require replacement.

In operation of the apparatus, the auxiliary body member 42 of the die head is provided with an insert 44 having a configuration to provide the desired shape of the composite strip to be extruded. A finishing die 43 of proper size and shape is also positioned in the recess in insert 44 and these parts are then placed in position on the main body member 36 of the die head. Fluid pressure is then supplied to the cylinders 59 moving the pins 56 and 57 into the aligned openings thereby properly locating the auxiliary body member 42 of the die head with respect to the main body member 36, the locations of the preforming die 44 and of the finishing die 43 being determined by the complementary surfaces on these members and in the recesses in which they are received. The retaining means, formed by the pairs of spaced bars 49 and 50, are then moved into operative position and the screws 52 tightened and locked in position by the nuts 53. Fluid under pressure is then supplied to the cylinder 63 in the direction which causes movement of the retaining fingers 62 into place thus holding the preforming die 44 and the finishing die 43 from outward movement. With the parts thus positioned, the motors 14, 15 and 16 are started and material is supplied to the hoppers 22, 33 and 34, the types of material thus supplied being dependent upon the characteristics of the composite strip desired. For example, the material supplied through the hopper 22 may be a rubber having good wear resistance suitable for forming the tread portion of a tire, while the material supplied to the hopper 33 may be such as to provide a white sidewall portion of the tire and the material supplied to the hopper 34 may be such as to provide a black sidewall for the tire. Should it be desired to form a tire having both sidewalls white, then the material supplied to the hopper 34 may be the same as that supplied to the hopper 33.

The materials thus supplied to the apparatus are moved from the hoppers and forced forwardly through the cylinders in the block 19 by the screws 18, 31 and 32 which exert pressure upon the material. From the feeding and pressuring cylinders, the materials move through the passages in the die block with the several composite materials uniting adjacent the outer ends of the die passages to form the single unitary strip, the locations of union of the several materials being determined by the nature of the walls in the removable insert or preforming die 44. It will be observed that since the several feeding means are disposed in parallel relationship and in alignment with the passages through the die head, and since these passages unite with a minimum of change in direction, the power required to operate the apparatus is materially less than that which is needed when the material must negotiate several sharp angles. Likewise, there is less loss of material and destruction thereof by build-up at sharp corners in the die head and other parts of the passageway through which the material moves.

When it is desired to change the nature of the materials extruded, clean the apparatus, or alter the shape of the composite strip, the die head may be readily disassembled by releasing the clamping means provided by the bars 49 and 50, retracting the finger-like portions 62, and withdrawing the locating pins 56 and 57. This provides ready access to substantially all of the passages in the die head and only a small part of each passageway is not fully exposed. This small portion of each passageway, however, is the cylindrical part in the plate-like portion 36 of the main die head and may be readily cleaned without any difficulty. Change in the locations of union of the several materials forming the composite strip is effected by changing the preforming die 44 as previously explained, and a similar replacement is effected when the size of the composite strip is to be changed. Obviously, in the latter case, it is also necessary to change the finishing die 43. After such cleaning and/or replacement of parts, the die head is reassembled, as has been previously described, and the operation resumed.

Although the invention has been described with reference to extruding a composite strip of rubber material formed from different types or compositions of rubber, it will be evident that the apparatus may be employed where the composite strip is formed from only a single material by providing such material in each of the feeding hoppers. Also, it will be evident that the apparatus may be used for forming articles other than strips suitable for forming the tread and sidewalls of a tire, this being effected by changing the shape of the passageways in the die head. It will also be evident that, although the two side feeding means 11 and 13 have been shown as employing cylinders and feeding screws of smaller diameter than those of the central material supplying mechanism, this is not an essential feature of the invention, the sizes of the several feeding mechanisms and other parts being chosen in accordance with nature of the product to be made by the apparatus. These and other changes in the details of construction and use of the apparatus will be readily apparent to those skilled in the art, and are intended to be encompassed within the ambit of the invention, the scope of which is defined by the subjoined claims.

Having thus described the invention, I claim:

1. A die head comprising a main body member having a plurality of spaced parallel material receiving openings in one end wall communicating with a common chamber open at one side and at the opposite end of said body, an auxiliary body member of said die head removably assembled with said main body member to provide a closure for the said open side of said chamber, the said auxiliary member having spaced portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of the said main body member so that the material issuing from the separate passages unites as it emerges therefrom, means for removably securing said auxiliary member to said main body member whereby the shape of the said passages and the locations of the union of the material issuing therefrom may be changed by substituting for the said auxiliary member another auxiliary member having wall portions of different dimensions, and means at the said open end of said chamber for shaping the material issuing from the chamber.

2. A die head comprising a main body member having a plurality of spaced parallel material receiving openings in one end wall communicating with a common chamber open at one side and at the opposite end of said body, an auxiliary body member of said die head removably assembled with said main body member to provide a closure for the said open side of said chamber, a removable insert on the inner surface of the said auxiliary member provided with spaced portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of said main body member so that the material issuing from the separate passages unites as it emerges therefrom, means for removably securing said auxiliary member to said main body member whereby the shape of the said passages and the locations of the union of the material issuing therefrom may be changed by substituting for the said insert another insert member having wall portions of different dimensions, and means at the said open end of said chamber for shaping the material issuing from the chamber.

3. A die head as defined in claim 2 wherein said auxiliary member and said insert are provided with complementary interfitting surfaces to provide a predetermined position of the insert relative to said auxiliary member, and removable locating pins engaged in aligned openings of said main and auxiliary members to maintain them in predetermined register.

4. A die head as defined in claim 3 and further comprising power means connected to said locating pins to move the latter to and from engagement in said main and auxiliary members.

5. A die head comprising a main body member having a plurality of spaced parallel material receiving openings in one end wall communicating with a common chamber open at one side and at the opposite end of said body member, an auxiliary body member of said die head removably assembled with said main body member to provide a closure for the said open side of said chamber, a removable insert on the inner surface of the said auxiliary member provided with spaced portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of said main body member so that the material issuing from the separate passages unites as it emerges therefrom and is preformed to the desired final shape, means for removably securing said auxiliary member to said main body member whereby the shape of the said passages and the locations of the union of the material issuing therefrom may be changed by substituting for the said insert another insert having wall portions of different dimensions, and finish die means at the said open end of said chamber for shaping the preformed material issuing from the chamber.

6. An apparatus of the character described comprising a plurality of means for feeding and pressuring separate quantities of plastic material, a die head comprising a main body member having a plurality of spaced openings in one end wall communicating respectively with said feeding and pressuring means and with a common chamber open at one side and at the opposite end of said body member, an auxiliary body member of said die head removably assembled with said main body member to provide a closure for the said open side of said chamber, a removable insert on the inner surface of the said auxiliary member provided with spaced wall portions projecting into said chamber and comprising separating walls in said chamber dividing the latter into passages equal in number to and in respective communication with said spaced openings in the main body member, the side surfaces of said walls converging towards each other and terminating adjacent the said opposite end of said main body member so that the material issuing from the separate passages unites as it emerges therefrom and is preformed to the desired shape, means for removably securing said auxiliary member to said main body member whereby the shape of the said passages and the locations of the union of the material issuing therefrom may be changed by substituting for the said insert another insert having wall portions of different dimensions, and means at the said open end of said chamber for completing the shaping of the material issuing from the chamber.

7. An apparatus of the character described comprising a plurality of hollow cylinders disposed with their axes extending parallel, a separate means in each cylinder for advancing plastic material therein out an end thereof under pressure, a die head secured to said cylinders and comprising a main body member having a plurality of spaced openings in one end wall thereof communicating respectively with said cylinders and with a common chamber open at one side and at the opposite end of said body member, an auxiliary body member of said die head removably assembled with said main body member to provide a closure for the said open side of said chamber, the said auxiliary member having spaced portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of said main body member so that material issuing from the separate passages unites as it emerges therefrom, means for removably securing said auxiliary member to said main body member, and means at the said open end of said chamber for shaping the material issuing from the chamber.

8. An apparatus of the character described comprising a plurality of hollow cylinders disposed with their axes extending parallel, a separate means in each cylinder for advancing plastic material therein out an end thereof under pressure, a die head secured to said cylinders and comprising a main body member having a plurality of spaced openings in one end wall thereof communicating respectively with said cylinders and with a common chamber open at one side and at the opposite end of said body member, an auxiliary body member of said die head removably assembled with said main body member to provide a closure for the said open side of said chamber, a removable insert on the inner surface of said auxiliary member provided with spaced portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of said main body member so that material issuing from the separate passages units as it emerges therefrom, means for removably securing said auxiliary member to said main body member whereby the shape of said passages and the locations of the union of the material issuing therefrom may be changed by substituting for the said insert another insert having wall portions of different dimensions, and means at the said open end of said chamber for shaping the material issuing from the chamber.

9. An apparatus of the character described comprising a plurality of hollow cylinders disposed with their axes extending parallel, a separate means in each cylinder for advancing plastic material therein out an end thereof under pressure, a die head secured to said cylinders and comprising a main body member having a plurality of spaced openings in one end wall thereof communicating respectively with said cylinders and with a common chamber open at one side and at the opposite end of said body member, an auxiliary body member of said die head removably assembled with said main body member to provide a closure for the said open side of said chamber, a removable insert on the inner surface of said auxiliary member provided with spaced wall portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of said main body member so that material issuing from the separate passages unites as it emerges therefrom, means for removably securing said auxiliary member to said main body member whereby the shape of said passages and the locations of the union of the material issuing therefrom may be changed by substituting for the said insert another insert having wall portions of different dimensions, and die means removably connected to said die head at the said open end of said chamber for completing the shaping of the material issuing from the chamber.

10. An apparatus of the character described comprising three hollow cylinders disposed with their axes extending parallel, a separate means in each cylinder for advancing plastic material therein out an end thereof under pressure, a die head secured to said cylinders and comprising a main body member having a plurality of spaced parallel openings in one end wall thereof communicating respectively with said cylinders and with a common chamber open at one side and at the opposite end of said body member, an auxiliary body member of said die head removably assembled with said main body member to provide a closure for the said open side of said chamber, the said auxiliary member having spaced portions projecting from one side face thereof into said chamber and comprising separating walls in said chamber dividing the latter into passages equal in number to and in respective communication with said spaced openings in the main body member, the side surfaces of said walls converging towards each other and terminating adjacent the said opposite end of said main body member so that material issuing from the separate passages unites as it emerges therefrom, means for removably securing said auxiliary member to said main body member, whereby the shape of said passages and the locations of the union of the material issuing therefrom may be changed by substituting for the said auxiliary member another auxiliary member having wall portions of different dimensions, and die means removably connected to said die head at the said open end of said chamber for shaping the material issuing from the chamber.

11. An apparatus of the character described comprising three hollow cylinders each having one end open and disposed with their axes extending parallel, a separate feed hopper for each cylinder, a separate screw in each cylinder for advancing plastic material from its hopper through the cylinder, a die head secured to said cylinders and provided with three separate parallel passages one end of each of which is aligned with the discharge end of one of the said cylinders respectively, said die head including a portion adjacent the said other ends of said passages separable from the main body of said die head, the said separable portion having a recess on the inner surface thereof, an insert provided with a surface complementary to and received in said recess thereby orienting the insert relative to said passages, the said insert including spaced wall members providing continuations of said passages, the said wall members having configurations such that they preform the plastic material moving through the passages and cause the material from the separate passages to unite as it emerges therefrom, a finishing die secured to said die head adjacent the location where the united material emerges from said passages to act upon the preformed material issuing from the die head, and means removably securing said separable portion and finishing die to the main body of said die head, whereby the locations of the unions between the material issuing from the several cylinders and the external size and shape of the extruded material can be changed by replacing said insert and finishing die.

References Cited in the file of this patent

UNITED STATES PATENTS

| | | |
|---|---|---|
| 1,918,127 | Pfeiffer | July 11, 1933 |
| 1,952,469 | Snyder et al. | Mar. 27, 1934 |
| 2,488,830 | Redington | Nov. 22, 1949 |
| 2,514,211 | Carlson | July 4, 1950 |
| 2,560,022 | Formaz | July 10, 1951 |
| 2,661,497 | Birmingham | Dec. 8, 1953 |
| 2,709,834 | Johnson | June 7, 1955 |

UNITED STATES PATENT OFFICE

CERTIFICATE OF CORRECTION

Patent No. 2,807,833                                            October 1, 1957

George H. Schanz

It is hereby certified that error appears in the printed specification of the above numbered patent requiring correction and that the said Letters Patent should read as corrected below.

Column 5, line 5, for "in such" read -- is such --; column 9, line 55, for "units" read -- unites --.

Signed and sealed this 3rd day of December 1957.

(SEAL)

Attest:

KARL H. AXLINE
Attesting Officer

ROBERT C. WATSON
Commissioner of Patents